(12) United States Patent
Yamazaki et al.

(10) Patent No.: US 7,306,373 B2
(45) Date of Patent: *Dec. 11, 2007

(54) LINEAR GUIDE APPARATUS

(75) Inventors: Yasuyuki Yamazaki, Saitama (JP); Toshio Yoshida, Saitama (JP)

(73) Assignee: NSK Ltd., Tokyo (JP)

( * ) Notice: Subject to any disclaimer, the term of this patent is extended or adjusted under 35 U.S.C. 154(b) by 410 days.

This patent is subject to a terminal disclaimer.

(21) Appl. No.: 10/934,758

(22) Filed: Sep. 7, 2004

(65) Prior Publication Data

US 2005/0232520 A1 Oct. 20, 2005

(30) Foreign Application Priority Data

Sep. 4, 2003 (JP) ............ P.2003-312411

(51) Int. Cl.
*F16C 29/06* (2006.01)
(52) U.S. Cl. .................................. 384/45
(58) Field of Classification Search .......... 384/43–45
See application file for complete search history.

(56) References Cited

U.S. PATENT DOCUMENTS

| | | | | |
|---|---|---|---|---|
| 5,755,516 | A | * | 5/1998 | Teramachi et al. ............ 384/45 |
| 5,829,883 | A | * | 11/1998 | Kawaguchi et al. .......... 384/45 |
| 6,170,986 | B1 | * | 1/2001 | Hsu et al. ..................... 384/15 |
| 6,200,031 | B1 | * | 3/2001 | Faulhaber et al. ........... 384/45 |
| 6,712,511 | B2 | * | 3/2004 | Matsui et al. ................ 384/45 |
| 6,957,916 | B2 | * | 10/2005 | Fujimura ..................... 384/45 |

FOREIGN PATENT DOCUMENTS

| | | |
|---|---|---|
| JP | 61-85716 UM | 6/1986 |
| JP | 7-317762 A | 12/1995 |
| JP | 2846050 B2 | 10/1998 |
| JP | 2936166 B2 | 6/1999 |
| JP | 3182134 B2 | 4/2001 |
| JP | 2001-248637 A | 9/2001 |

* cited by examiner

*Primary Examiner*—Thomas R. Hannon
(74) *Attorney, Agent, or Firm*—Sughrue Mion, PLLC

(57) ABSTRACT

A slider is constituted by a main body made of a metal and a frame member and an end cap made of a synthetic resin. The main body is provided with a rolling groove. The frame member is provided with a return passage and an inner side groove of a direction changing passage. The end cap is provided with an outer side groove of the direction changing passage. A longest outer dimension in a slider width direction between lower end portions of inner legs of the main body is made to be larger than a shortest dimension in the slider width direction between projected portions of the frame member. The frame member is detachably engaged with the main body by putting a side of a leg portion of the main body to and from a side of a frame member horizontal portion by elastically deforming the frame member.

10 Claims, 12 Drawing Sheets

LINEAR GUIDE APPARATUS

BACKGROUND OF THE INVENTION

1. Field of the Invention

The present invention relates to a linear guide apparatus constituted by a guide rail, a slider and a plurality of rolling elements.

2. Description of the Related Art

FIG. 7 shows a example of the linear guide apparatus according to the related art. As shown in the drawing, a linear guide apparatus is constituted by a guide rail 1, a slider 2, which is also referred to as "bearing", and a plurality of ball 3 as a rolling element.

The guide rail 1 includes rolling grooves 11 extended in axial direction and formed at both side surfaces thereof. The slider 2 has leg portions 2A arranged on both sides in a width direction of the guide rail 1, and a horizontal portion 2B connecting the leg portions 2A each other. The horizontal portion 2B is arranged on one end side (i.e., upper face side of the guide rail 1 in the drawing) in a thickness direction of the guide rail 1, that is a direction orthogonal to both of a length direction and a width direction. Further, two inner side faces of the slider 2 are arranged at two side faces of the guide rail 1 so as to be opposed each other.

The slider 2 is divided into a main body 21 and end caps 22 in a guiding direction, and the end caps 22 are arranged at the both ends in the guiding direction of the main body 21. Further, two inner side faces of the main body 21 are formed with rolling grooves 21a opposed to the rolling grooves 11 of the guide rail 1 respectively. A rolling passage 12 of the balls 3 is formed by the rolling grooves 11, 21a.

A return passage 21b in a linear shape is formed on an outer side of the rolling groove 21a of the main body 21 of the slider 2. Direction changing passages 22a in a shape of a semicircular arc are formed at the portions of the end cap 22 arranged at two side faces of the guide rail 1. The rolling passage 12 and the return passage 21b are communicated by the direction changing passage 22a. A circulating passage 25 for infinitely circulating the balls 5 is constituted by the respective passages.

The linear guide apparatus is provided with four pieces that are two pairs and four rows of the circulating passages and the slider 2 slides along the guide rail 1 by rolling the balls 3 at the respective circulating passages 25.

Although according to the linear guide apparatus of the related art, the return passage 21b is formed by boring the main body 11 made of a metal, the operation takes time, labor and cost.

As a method of substituting the above-mentioned fabricating method, in Japanese Utility Model Unexamined Publication JP-UM-A-61-85716, there is described a method of providing a recessed groove on an outer side of a leg portion of a slider, covering the recessed groove by a closing member and fixing both ends in a length direction of the closing member by the end caps According to the method, a return passage is constituted by the recessed groove and an inner face of the closing member.

However, according to the method described in the JP-UM-A-61-85716, a number of parts are increased and integration is complicated more than the method of boring the main body made of a metal. Further, when the closing member is insufficiently fixed, there is a case in which the part is vibrated and noise is emitted.

Further, Japanese Patent Examined Publication JP-B-2846050 describes that a slider is divided into a block made of a metal, a square ring member made of a synthetic resin and a pair of plates made of a synthetic resin. In a width direction of the slider, each of two leg portions of the slider is divided into the block and the square ring member or the plate. Further, in a thickness direction of the slider, each of the leg portions at outer side portions in the width direction is divided in two of the square ring member and the plate. Further, grooves are provided on the square ring member and the plate in the thickness direction so as to form a return passage and a direction changing passage.

According to the slider described in the JP-B-2846050, the direction changing passage is constituted by the groove divided in two in the thickness direction. Therefore, also a scoop portion which is referred to as tongue for directing a rolling element from a rolling groove to the direction changing passage, or vice versa, is constituted by a member, divided in two in the thickness direction. Accordingly, strength of the tongue is deteriorated in comparison with the case in which the scoop portion comprises an undivided member.

As a proposal capable of resolving the problem, Japanese Patent Unexamined Publication JP-A-7-317762 describes that there is formed a slider in which a return passage is constituted by an undivided member by integrally molding at least a portion on an outer side in a width direction of a leg portion that is a portion formed with the return passage to a block member as a mold member comprising synthetic resin.

However, according to the slider described in the JP-A-7-317762, the mold member having the outer side portion in the width direction of the leg portion is fixed to the block member by integral molding. Therefore, it is difficult to modify the slider after molding. Further, because a structure of a die of integral molding is complicated, there is a room for improvement also in view of productivity.

That is, according to the slider described in JP-A-7-317762, because the resin continuously covers the slider, modifications including a modification of a groove depth, a shape or the like of the rolling groove cannot be carried out at all after molding. Therefore, the resin must be destructed when adjustment of pre-pressure is required or an improvement in operability is required. Further, the resin flows in a thin-walled state at a surrounding the slider, particularly, because the resin is made to flow elongated along the longitudinal direction to the slider, the molding performance is poor and a structure of the die becomes complicated. Further, a step of cooling the slider after molding by putting the slider into the die is needed and therefore, time is taken for fabrication.

There are pointed out that the linear guide apparatuses described in Japanese Patent Examined Publications JP-B-2936166 and JP-B-3182134, as the example of linear guide apparatus which include a slider in which a return passage of a rolling element is constituted by an undivided member and in which productivity of the slider is higher than that of the JP-A-7-317762.

The JP-B-2936166 and JP-B-3182134 describe that an outer side portion in a width direction of a leg portion of the slider that is a portion formed with return passage is constituted by a mold member comprising a synthetic resin and the outer side portion is separate from a block member made of a metal.

According to the linear guide apparatus of the JP-B-2936166, the slider is constituted by a main body of a metal, a frame member made of a synthetic resin including a portion formed with a return passage, and a turning plate made of a synthetic resin including an outer groove of a direction changing passage. The frame member includes an end plate provided on an outer side in a guiding direction in respect to the turning plate. The turning plate is arranged between the end plate and the main body in the guiding direction. Further, the turning plate includes a projection fitted to a recessed portion of an upper face of the main body. The projection is fitted to the recessed portion of the side plate of the frame member. That is, respective members are connected by the projection and the recessed portion which receives the projection.

According to the linear guide apparatus of the JP-B-3182134, the slider is constituted by a main body made of a metal, a pair of left and right side frames made of a synthetic resin including a portion formed with a return passage, and an end cap made of synthetic resin including an outer groove of a direction changing passage. The members are connected by a dowel, mortise joint or snapping means.

Further, Japanese Patent Unexamined Publication JP-A-13-248637 describes that a return passage of the slider is formed by inserting a pipe into a through hole formed at a position of the return passage, a slit is provided at the pipe to constitute an oil groove, and a felt is fixed to an inner peripheral surface of the pipe to impregnate a lubricant.

In the JP-B-2936166, the members having passages which form a circulation passage of the rolling elements are connected each other by engaging the protrusion portion with the recessed portion. However, because the members are not connected firmly relative to the members which are made of undivided member, it tends to occur vibration when the rolling elements roll in the circulation passage.

Further, in the JP-B-3182134, the side frames on which the return passages are formed and the end cap on which the direction changing passage is formed are made separately, and these members are connected each other by snapping means. However, because the return passage and the direction changing passage are not connected firmly relative to the members which are made of undivided member, it tends to occur vibration when the rolling element rolls between the return passage and the direction changing passage. Even a small manufacturing error of the snapping means way occur the vibrations. Therefore, there is a room of improvement in view of vibration in the linear guide apparatus described in the above-mentioned cases.

SUMMARY OF THE INVENTION

The present invention has been carried out in order to resolve the problem of the related art and it is an object thereof to provide a linear guide apparatus in which an outer side portion in a width direction of a slider is formed by a mold member for restraining vibration in driving to be low and improving an acoustic characteristic. The mold member made of a synthetic resin is different from that of a block member made of a metal.

In order to achieve the above-described object, according to a first aspect of the present intention, there is provided a linear guide apparatus, comprising;

a guide rail having an inner groove of a rolling passage on each side thereof;

a slider slidably mounted on said guide rail, said slider having outer grooves of the rolling passage respectively disposed in opposition to said inner grooves of said guide rail so as to the define rolling passages therebetween, said slider being provided with a number of circulating passages; and a number of rolling elements being put in each of said circulating passages, wherein each of said circulating passages includes said rolling passage, a return passage extending in parallel with said rolling passages, and direction changing passages interconnect said rolling passage and said return passage, said slider includes a metal main body, a frame member detachably engaging with an outer side of the metal main body, and end caps provided on both axial direction ends of the frame member, the metal main body includes a body horizontal portion and inner leg portions provided on both width direction ends of the body horizontal portion, each inner leg portion of the metal main body has recessed portions at an outer side thereof along with the axial direction of the slider respectively, and the outer grooves of the rolling passage at both inner sides thereof respectively, the frame member includes, frame horizontal portions provided on both ends in the axial direction of the slider, and outer leg portions provided on both width direction ends of the frame horizontal portion, each of the outer leg portions has the return passage, inner grooves of the direction changing passage, and projection portions at an inner sides thereof along with the axial direction of the slider, the projection portions being opposed to the recessed portions of the metal main body, the end cap includes an end cap horizontal portion and end leg portions provided on both width direction ends of the end cap horizontal portion, the projection portions of the frame member engage with the recessed portions of the metal main body respectively so as to integrally couple with the metal main body and the frame member, and the end caps are fixed to the metal main body via the frame member.

According to a second aspect of the present invention according to the first aspect of the present invention, the return passage has a portion for enhancing a lubricating state of the rolling elements.

According to a third aspect of the present invention according to the first aspect of the present invention, each of the projection portions extends from one end to the other end of the frame member in the axial direction thereof.

According to a fourth aspect of the present invention according to the second aspect of the present invention, said portion of the return passage is an oil groove extending in the axial direction.

According to a fifth aspect of the present invention according to the first aspect of the present invention, the frame member is made of synthetic resin, the main body has an outer largest dimension in a width direction of the slider defined at a portion between lower end portions of the inner leg portions and the frame member has an inner smallest dimension in a width direction of the slider defined at a portion between the projected portions of the frame member, which is smaller than the outer largest dimension, the main body is engaged with the frame member in such a manner that the leg portion is inserted to the frame member from a frame horizontal portion side after elastically deforming the frame member.

According to a sixth aspect of the present invention according to the first aspect of the present invention, female screws are formed at both end faces of the main body horizontal portion in the axial direction, through holes in correspondence with the female screws are formed at the frame member horizontal portion and the end cap horizontal portion, and male screws are connected with the female screws by passing the through holes of the end cap and the frame member to thereby fix the end cap and the frame member to the main body.

According to a seventh aspect of the present invention according to the second aspect of the present invention, female screws are formed at both end faces of the main body horizontal portion in the axial direction, through holes in correspondence with the female screws are formed at the frame member horizontal portion and the end cap horizontal portion, and male screws are connected the female screws by passing the through holes of the end cap and the frame member to thereby fix the end cap and the frame member to the main body.

According to an eighth aspect of the present invention according to the second aspect of the present invention, the portion of the return passage is an oil groove extending along with an axial direction of the slider, and the frame horizontal portion has an oil supplying hole and an oil passage on an end cap side thereof, the oil passage communicating with the oil supplying hole.

According to a ninth aspect of the present invention, as set forth in the first aspect of the present invention, the inner leg of the main body, the outer leg portion of the frame member and the end leg portion of the end cap form a leg portion of the slider, a horizontal portion of the slider is formed of the body horizontal portion which forms main part thereof, the frame horizontal portion and the end cap horizontal portion which forms an end portion in the axial direction of the guide rail, the horizontal portion of the slider is provided at a thickness direction side of the slider and connects with the leg portions of the slider.

In the linear guide apparatus of the present invention, the horizontal portion of the slider is constituted by the frame member horizontal portion and the main body horizontal portion and the cap horizontal portion, mentioned above, and when the "horizontal portion" is simply referred, the "horizontal portion" indicates the horizontal portion of a total of the slider combining these.

DETAILED DESCRIPTION OF THE PREFERRED EMBODIMENTS

A first embodiment of the present invention will be explained as follows.

Figure 1:
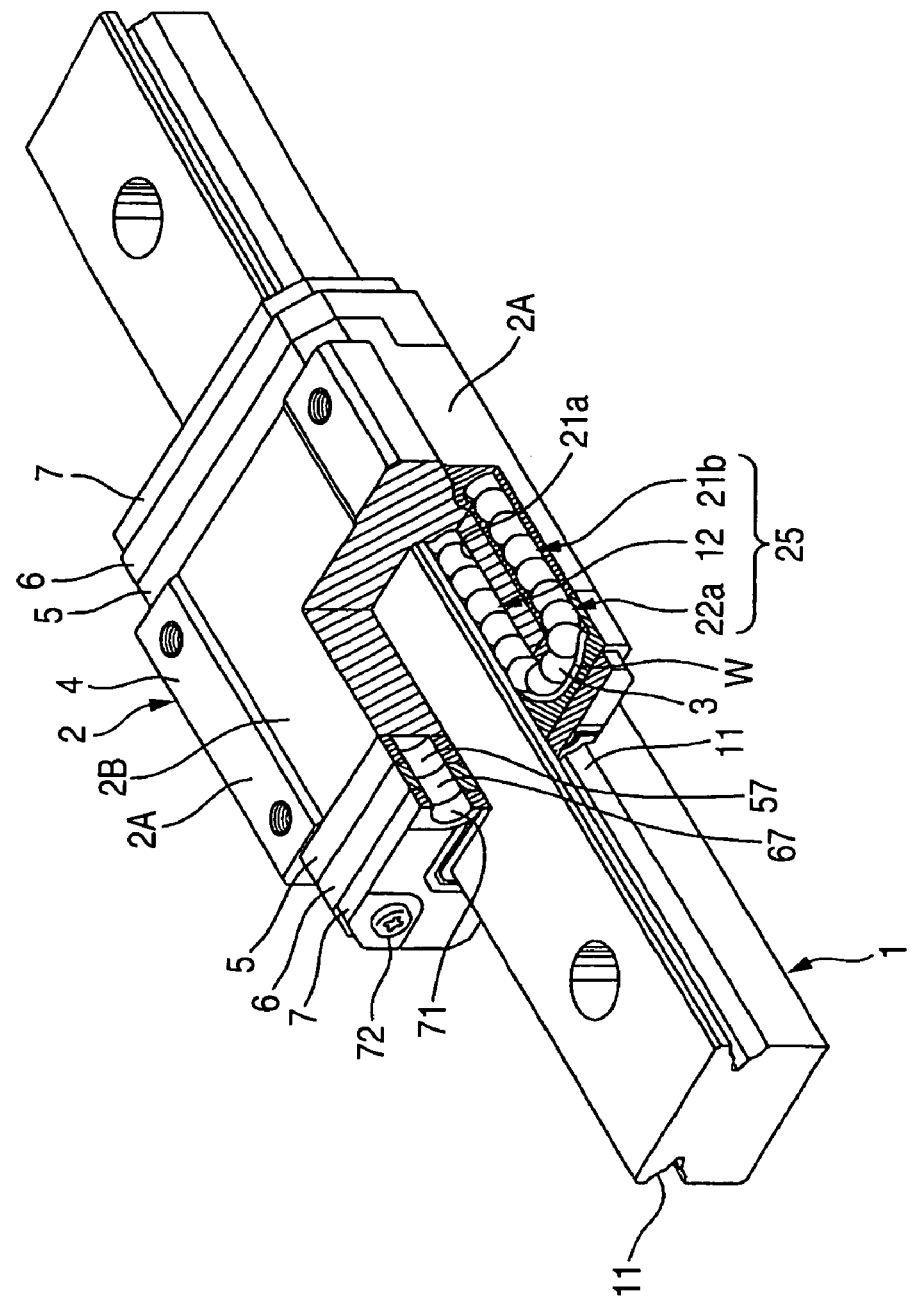
FIG. 1 is a perspective view showing a linear guide apparatus in correspondence with an embodiment of the present invention

FIG. 1 is a perspective view showing a linear guide apparatus in correspondence with an embodiment of the present invention. The linear guide is constituted by a guide rail 1, a slider 2 and a plurality of balls 3 as rolling elements.

The guide rail 1 includes rolling grooves 11 extended in parallel with a longitudinal direction at both side faces thereof. The slider 2 comprises leg portions 2A arranged on both sides in a width direction of the guide rail 1 and a horizontal portion 2B connecting the two leg portions 2A. The horizontal portion 2B is arranged on one end side in a thickness direction of the guide rail 1, which is upper face side of the guide rail 1 in the drawing. Further, both inner side faces of the slider 2 are arranged to be opposed to both side faces of the guide rail 1.

Inner side faces of the two leg portions 2A of the slider 2 are formed with rolling grooves 21a opposed to the rolling grooves 11 of the guide rail 1. A rolling passage 12 of the balls 3 is formed by the rolling grooves 11, 21a.

Return passages 21b of the balls are linearly formed at outer side portions of the two leg portions 2A, further, a direction changing passage 22a for communicating the return passage 21b and rolling passage 12 is formed. A circulating passage 25 for infinitely circulating the balls 3 is constituted by the return passage 21b, the rolling passage 12 and the direction changing passage 22a. The linear guide apparatus is provided with two pieces, which have one pair and two rows, of the circulating passages and the slider 2 is slid along the guide rail 1 by rolling the balls 3 in the respective circulating passages.

The slider 2 of the embodiment is constituted by a main body 4 made of a metal, a frame member 5 made of a synthetic resin and an end cap 6 made of a synthetic resin. Further, a side seal 7 is attached on an outer side of the end cap 6.

Figure 2:
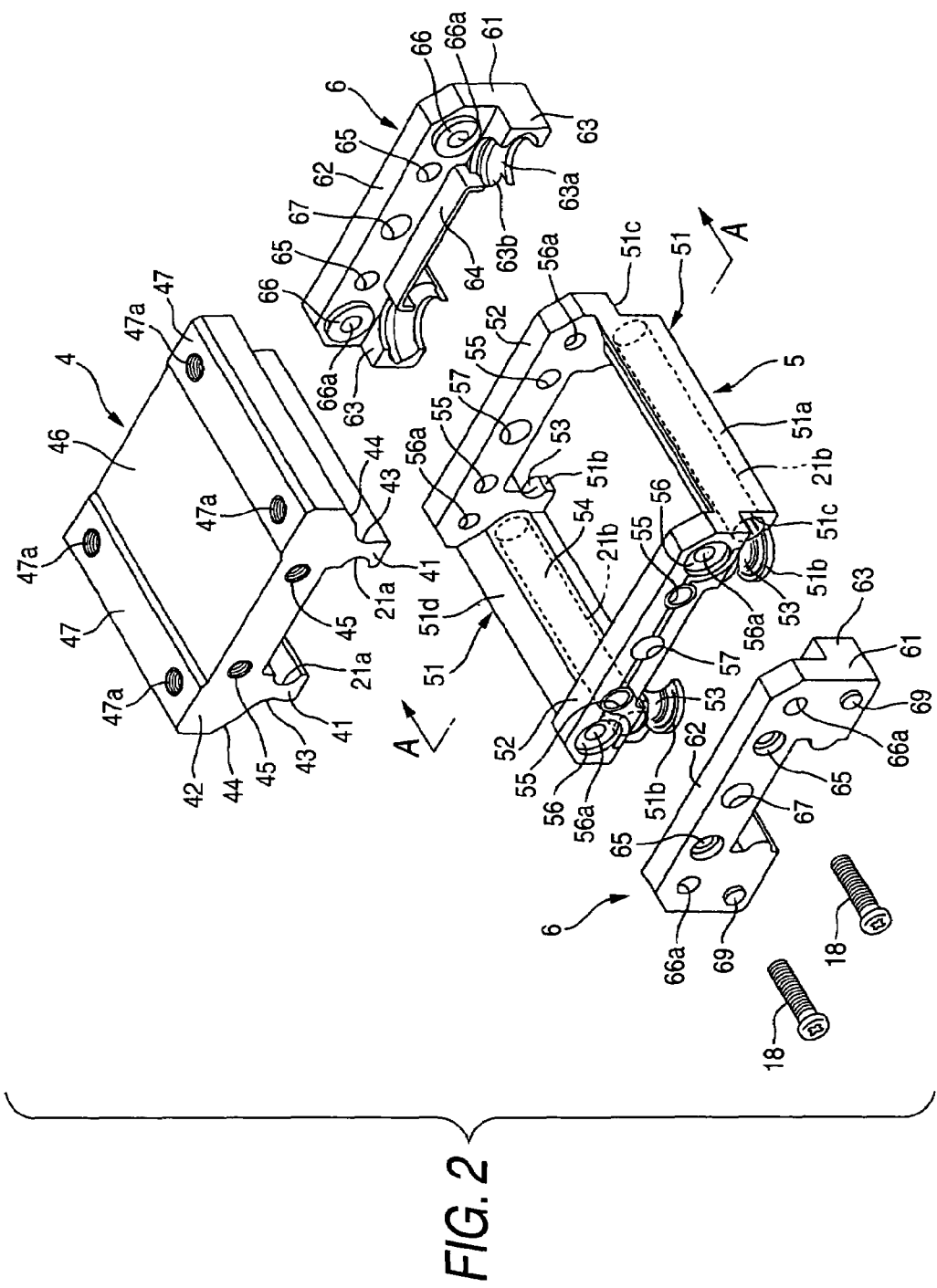
FIG. 2 is a perspective view showing a disassembled state of the slider of the linear guide apparatus.
Figure 3:
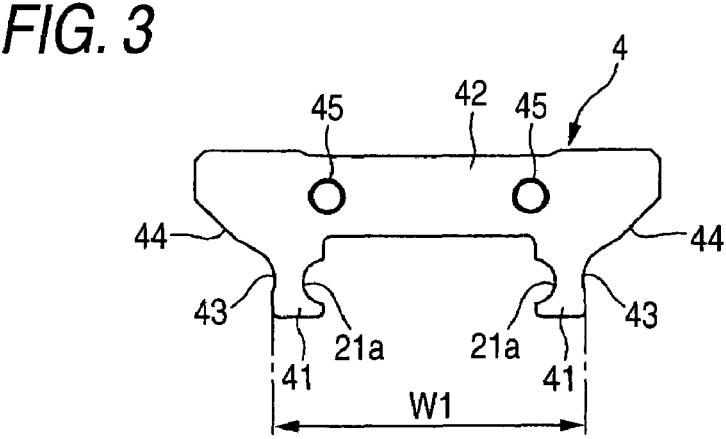
FIG. 3 is a front view showing a main body constituting the slider of FIG. 2.
Figure 4:
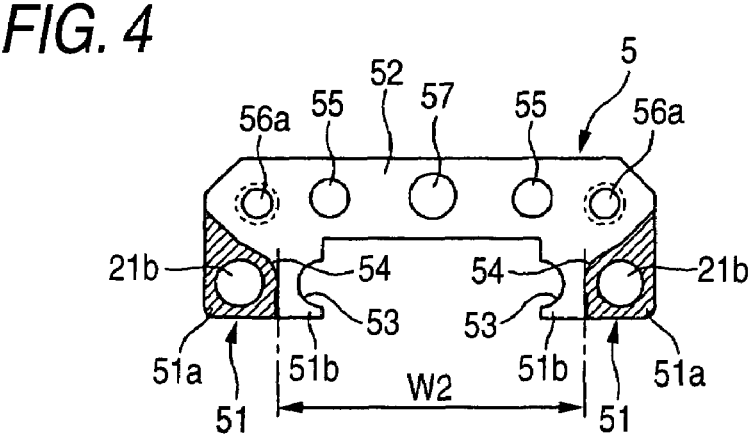
FIG. 4 is a sectional view of a frame member of the slider taken along a line A-A of FIG. 2.
Figure 5:
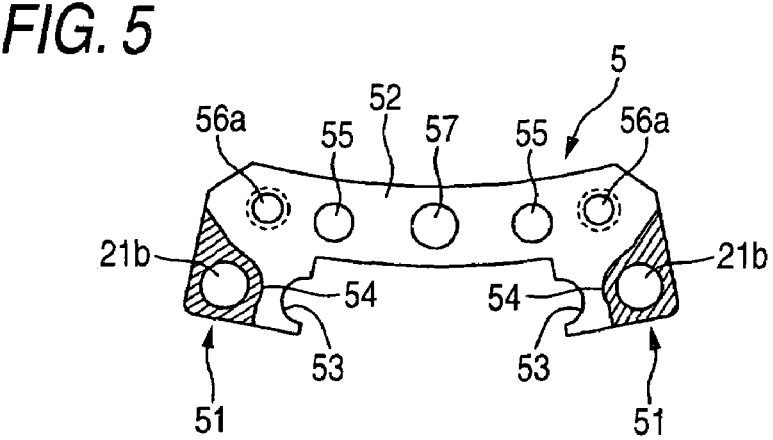
FIG. 5 is a sectional view showing a state of elastically deforming the frame member of FIG. 4.
Figure 6:
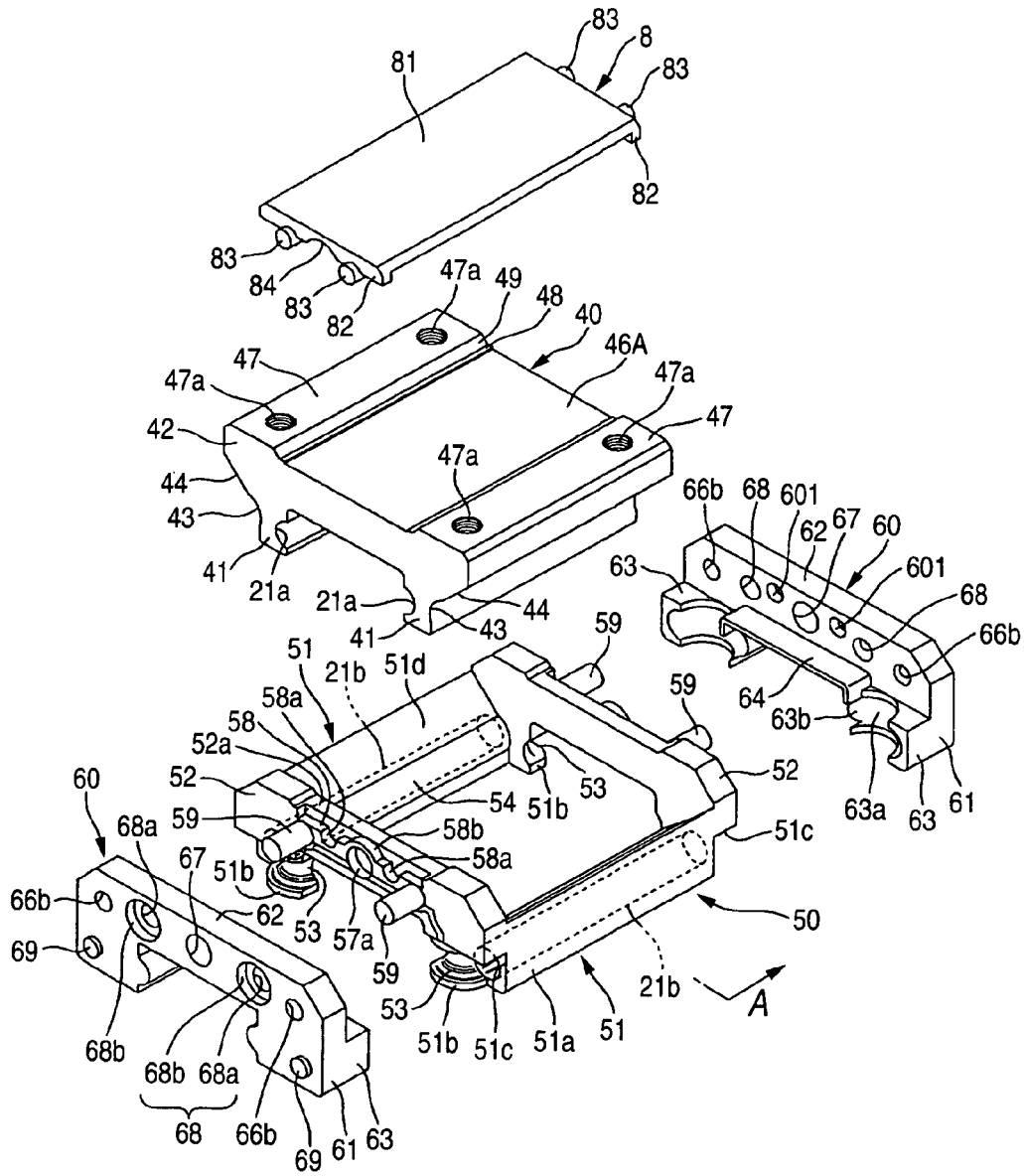
FIG. 6 is a view showing an embodiment of a slider constituting the linear guide apparatus of FIG. 1 which is different from that of FIG. 2 and a perspective view showing a disassembled state of the slider.
Figure 7:
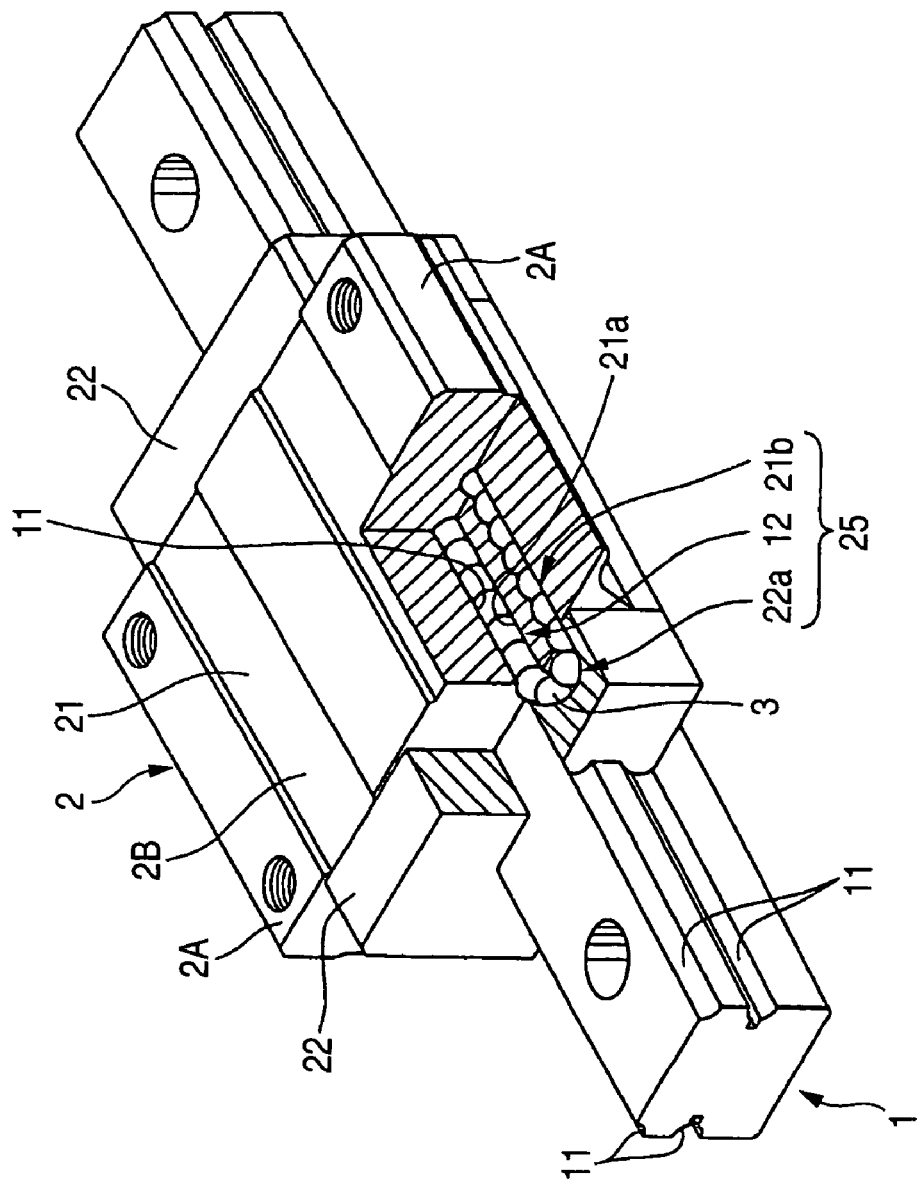
FIG. 7 is a perspective view showing a conventional example of a linear guide apparatus.

FIG. 2 shows a disassembled state of the slider 2 by a perspective view. Further, FIG. 3 shows a front view of the main body 4 and FIG. 4 shows a sectional view taken along a line A-A of FIG. 2 of the frame 5. Further, FIG. 5 shows a partially sectional side view of the frame member 5 and FIG. 6 shows a partial front view of the frame member 5.

As shown in the drawings, the main body 4 comprises inner legs 41 constituting inner side portions in the width direction of the leg portion 2A, and a main body horizontal portion 42 constituting an essential portion of the horizontal portion 2B. Further, a rolling groove 21a is formed on an inner side of the inner leg 41, and a recessed portion 43 in parallel with the rolling groove 21a is formed on an outer side of the inner leg 41. A tapered face 44 a dimension on a side of the recessed portion 43 of which is small is formed between a recessed portion 43 and an end face in the width direction of the main body horizontal portion 42.

Further, respective two pieces of female screws 45 are formed at both end faces in a guiding direction of the main body horizontal portion 42. Two pieces of the female screw 45 are arranged at a predetermined interval in the width direction. A recessed portion 46 is formed at a center portion in a slider width direction of an upper face of the main body horizontal portion 42, and outer side portions 47 at side portions of the recessed portion 46 are formed with respective two pieces of female screw holes 47a for attaching other member of a table or the like at a predetermined interval in the guiding direction.

Further, the main body 4 is made of SUS 440C or the like, the main body 4 is fabricated by drawing process or cutting process of the metal.

A projected portion 54 in parallel with the return passage 21b is formed on an inner side of the first portion 51a of the outer leg 51. A through hole 55 in correspondence with a female screw 45 of the main body 4 is formed at the frame member horizontal portion 52. Both end portions in a width direction of the frame member horizontal portion 52 are formed with recessed portions 56 for positioning the end cap 6 and through holes 56a penetrating centers of the recessed portions 56. A through hole 57 is formed at the center portion in the width direction of the frame member horizontal portion 52. The through hole 57 is a hole communicating with a through hole 67 i.e., grease nipple attaching hole, provided at the end cap 6.

Further, the frame member 5 is fabricated by subjecting a synthetic resin POM or the like to injection molding.

The end caps 6 are members arranged at both end portions in a guiding direction of the frame member 5 and each end caps comprise end legs 61 constituting end portions in the guiding direction of the two leg portions 2A, and end cap horizontal portions 62 constituting endmost portions in the guiding direction of the horizontal portion 2B of a total of the slider. A projection 63 having a recess in a shape of a semicircular arc is formed on a side of the frame member of the end leg 61, and the projection 63 is formed with an outer side groove 63a of the direction changing passage 22a. An end portion on an inner side in the width direction of the outer groove 63a constitutes a tongue 63b for scooping up the balls 3 from the rolling groove 12. Further a plate-like member 64 extended from a lower face of the end cap horizontal portion 62 is formed between the two projections 63 by a projection length the same as that of the two projections 63.

Further, the end cap horizontal portion 62 is formed with a through hole 65 in correspondence with the female screw 45 of the main body 4. Inner faces of both end portions in the width direction of the end cap horizontal portion 62 are formed with projections 66 for positioning the frame member 5 and through holes 66a penetrating centers of the projections 66. When the projection 66 is fitted to the recessed portion 56 of the frame member 5, the through hole 56a of the frame member 5 and the through hole 66a of the end cap 6 are communicated with each other.

The through hole 67 is formed at the center portion in the width direction of the end cap horizontal portion 62. The through hole 67 is the grease nipple attaching hole, the through hole 57 of the frame member 5 is formed to communicate therewith, and also the side seal 7 is formed with a through hole 71 to communicate therewith. Further, an outer face of the end leg 61 is formed with a projection 69 for positioning the side seal 7.

Further, the end cap 6 is fabricated by subjecting a synthetic resin of POM or the like to injection molding.

Here, the longest outer dimension W1 as shown in FIG. 3, in a slider width direction between low end portions of the inner legs 41 of the main body 4, that is end portions on sides of being remote from the main body horizontal portion 42 of the recessed potion 43, is formed to be larger than a shortest dimension W2 as shown in FIG. 4 in the slider width direction between the projected portions 54 of the frame member 5.

Integration of the slider 2 is carried out by manual operation or pressing process. In the case of manual operation, first, the inner legs 41 which are sides of leg portions of the main body 4 are put into the frame member 5 from a side of the frame member horizontal portion 52, the thumb is touched to either one of the outer side portion 47 of the upper face of the main body horizontal portion 42 and the lower portion 51a of the outer leg 51 of the frame member 5, the forefinger and the middle finger are touched to other thereof, and a force in a direction of making the thumb and the forefinger as well as the middle finger proximate to each other is exerted by the both hands simultaneously on both left and right sides.

Thereby, the frame member 5 is elastically deformed as shown by FIG. 5, and the projected portion 54 of the frame member 5 is fitted to the recessed portion 42 of the main body 4. Further, the inner leg 41 of the main body 4 and the first member 51a with the outer leg 51 of the frame member 5 are fitted to each other, the tapered face 44 of the main body 4 and the tapered face 51d of the frame member 5 are fitted to each other, and the outer face of the main body horizontal portion 42 of the main body 4 and the inner face of the frame member horizontal portion 52 of the frame member 5 are fitted with each other. In this way, the main body 4 and the frame member 5 are easily integrated, and positioning in the width direction and the guiding direction and the vertical direction i.e., thickness direction, is carried out finely.

Further, when the main body 4 is detached from the frame member 5, one end in the integrated object is held by the one hand and other end thereof is held by the other hand. Further, in each of the hands, for example, the thumb is touched to the lower face of the main body horizontal portion 42 of the main body 4, the forefinger and the middle finger are touched to the upper face of the frame member horizontal portion 52 of the frame member 5, and a force of pressing the main body horizontal portion 42 by the thumb and a force of pressing the upper face of the frame member horizontal portion 52 by the forefinger and the middle finger are exerted simultaneously. Thereby, the frame member 5 is elastically deformed as shown by FIG. 5 and fitting of the respective portions of the main body 4 and the frame member 5 is released. The frame member is attachable with the main body after being detached therefrom.

After integrating the main body 4 and the frame member 5 as described above, by arranging the end caps 6 to both ends in the guiding direction of the frame member 4 and by fitting the projections 66 of the end caps 6 to the recessed portions 56 of the frame member 5, the projections 63 of the end caps 6 are fixed to the stepped portions 51c of the frame member 5. Further, the plate-like member 64 of the end caps 6 is fitted to the lower face of the frame member horizontal portion 52 of the frame member 5 and the through hole 53 of the frame horizontal portion 52 of the frame member 5 and the through hole 65 of the end cap 6 are communicated. Further, the through hole 56a of the frame member 5 and the through hole 66a of the end cap 6 are communicated with each other.

Further, by passing a screw 18 to the through holes 55, 65 from an outer side of the end cap 6 and screwing a front end thereof to the female screw 45 of the main body 4, the end cap 6 and the frame member 5 are fixed to the main body 4 by the screw 18 to thereby integrate the slider 2.

By using the slider 2, the balls 3, the guide rail 1, the side seal 7 and a retaining wire W integrated in this way, the linear guide apparatus shown in FIG. 1 is integrated. At this occasion, first, the balls 3 are put into the return passage 21b, the direction changing passage 22a and the rolling groove 21a of the slider 2, the balls 3 put into the rolling groove 21a are retained by the retaining wire W and thereafter, the slider 2 is integrated to the guide rail 1.

Next, by utilizing the projected portion 69 of the end cap 6, the side seal 7 is positioned to the slider 2, and the side seal 7 is fixed to the slider 2 by a tapping screw 72 by using the through holes 56a, 66a. Next, a grease nipple is inserted into the through hole as a one example of grease nipple attaching hole 67 of the end cap 6 via the through hole 71 of the side seal 7.

According to the linear guide apparatus, the slider 2 is divided into the main body 4 having the rolling groove 21a, the frame member 5 having the return passage 21b and the inner groove 53 of the direction changing passage 22a, and the end cap 6 having the outer groove 63a of the direction changing passage 22a and therefore, in comparison with the slider described in JP-A-7-317762, mentioned above, for integrally molding a molded member which corresponds to the frame member 5 of the embodiment including the return passage portion to the block member, a shape of the rolling groove after molding can easily be modified.

Further, since the frame member 5 is molded by a single member, molding performance is excellent more than in the case of integral molding and further, a structure of a die can be simplified. Further, a production system pursuing an efficiency of molding can be adopted since production of the frame member 5 can be promoted independently from production of the main body 4. Further, the main body 4 and the frame member 5 can simply be attached and detached even by manual operation as described above and the frame member 5 can easily and firmly be fixed to the main body 4 by screwing along with the end cap 6. In this way, the slider 2 according to the embodiment is advantageous also in view of productivity in comparison with the slider described in JP-A-7-317762, mentioned above.

Further, although according to the embodiment, the slider is integrated by fixing the frame member 5 and the end cap 6 to the main body 4 by screwing, the slider constituting the linear guide apparatus of the present invention can also be integrated without using screws. An example thereof is shown below. According to the example, the slider 2 constituting the linear guide apparatus of FIG. 1 is constructed by a constitution as shown by, for example, FIG. 6, The embodiment will be explained as follows.

The slider is constituted by a frame member 50 made of a synthetic resin, an end cap 60 made of a synthetic resin and a top cover as one of example of plate-like member 8 made of a synthetic resin. Further, the top cover 8 is used for firmly preventing the main body 40 from being drawn out from the frame member 50 in a vertical direction. FIG. 6 is a perspective view showing a disassembled state of the slider.

As shown by FIG. 6, the main body 40 comprises the inner legs 41 constituting the inner side portions in the width direction of the two leg portions 2A, and the main body horizontal portion 42 constituting an essential portion of the horizontal portion 2B of a total of the slider. Further, the rolling groove 21a is formed on the inner side of the inner leg 41 and the recessed portion 43 in parallel with the rolling groove 21a is provided on the outer side of the inner leg 41. In the two end faces in the width direction of the main body 40, a tapered face 44 is formed between the recessed portion 43 and the main body horizontal portion 42. The tapered face 44 is declined inwardly toward a down direction as shown in FIG. 6.

Further, a recessed portion 46A is formed at a center portion in a slider width direction of an upper face of the horizontal portion 2B, and respective two pieces of the female screw holes 47a for attaching other member of a table or the like are formed at the outer portions 47 at side portions of the recessed portion 46a at predetermined intervals in the guiding direction. Edge portions 48 and inclined portions 49 are formed in this order from the recessed portion 46a to outer side portions between the recessed portion 46a and the two outer side portions 47. A face of the edge portion 48 constitutes a face slightly higher than the recessed portion 46a, and a distance between the two edge portions 48 constitutes a dimension slightly larger than a width of the top cover 8. That is, the upper face of the horizontal portion 2B of the main body 40 is formed such that the top cover 8 is loosely fitted into the recessed portion 46A.

Further, the main body 4 is made of SUS440C or the like, and the main body 4 is fabricated by drawing process and cutting process.

The top cover 8 comprises a cover portion 81 in a shape of a rectangular plate, foot portions 82 provided at the both ends in an axial direction of the cover portion 81 and four pieces of two pairs of projections 83. The foot portion 82 is formed to extend orthogonally from a plate face of the cover portion 81 and a recessed portion 84 in a shape of a circular arc is formed at the position of the foot portion 82 in correspondence with a center in the plate width direction of the cover portion 81. The projection 82 is formed in a shape of a circular column, a base thereof which is arranged at a lower face of the foot portion 82 and a front end thereof is projected to an outer side from each of the two ends in the length direction of the cover portion 81. An axial length of the cover portion 81 is the same as a dimension in the guiding direction of the frame member 50.

The frame member 50 comprises the outer legs 51 constituting outer side portions in the width direction of the two leg portions 2A and the frame member horizontal portion 52 constituting the end portion in the guiding direction of the horizontal portion 2B at a total of the slider.

The outer leg 51 comprises the first portion 51a and the second portion 51b, the first portion 51a is arranged to connect the two frame member horizontal portions 52 and is formed with the return passage 21b at inside thereof. The second portion 51b is the projection in the shape of the semicircular arc extended from the first portion 51*a* in a direction of an outer face of each of the two frame member horizontal portions 52 and the projection is formed with the inner groove 53 of the direction changing passage 22*a* continuous to the return passage 21*b*.

A stepped difference portion 51*c* is present between the first portion 51*a* and the second portion 51*b*. Further, an upper face of the first portion 51*a* is formed into the tapered face 51*d* to be fitted with the tapered face 44 of the main body 4. The projected portion 54 in parallel with the return passage 21*b* is formed on the inner side of the first portion 51*a* of the outer leg 51.

The frame member horizontal portion 52 is formed with a recessed portion 52*a* continuous to the recessed portion 46*a* of the main body 40 Further, in the axial direction, the frame member horizontal portion 52 is formed with an end portion 58 to be fitted with an engaging portion i.e., foot portion 82, projection 83 and recessed portion 84, provided at each of the both end portions in the guiding direction of the top cover 8. The recessed portion 58 is formed with two recessed portion 58*a* in a shape of a circular arc to be fitted with the two projections 83 of the top cover 8 and a projected portion 58*b* in a shape of a circular arc to be fitted with the recessed portion 84 of the top cover 8.

Further, the frame member horizontal portion 52 is formed with a hole 57*a* comprising a circle concentric with a circle constituting the projected portion 58*b* in the shape of the circular arc. The hole 57*a* is a hole communicating with the through hole 67 i.e., grease nipple attaching hole, provided at the end cap 6. Further, outer sides of the horizontal portion 25 are formed with projections 59 extended in the guiding direction at the positions constituting outer sides in the width direction of the two recessed portions 58*a* in the shape of the circular arc.

Further, the frame member 5 is fabricated by subjecting a synthetic resin of POM or the like to injection molding.

The end caps 60 are members arranged at the both end portions in the guiding direction of the frame member 50 and comprise the end legs 61 constituting end portions in the guiding direction of the two leg portions 2A, and the end cap horizontal portion 62 constituting an endmost portion in the guiding direction of the horizontal portion 2B at a total of the slider. The projection 63 having the recess in the shape of the semicircular arc is formed on the side of the frame member of the end leg 61, and the outer side groove 63*a* of the direction changing passage 22*a* is formed at the projection 63. The end portion of the inner side in the width direction of the outer groove 63*a* constitutes the tongue 63*b*. Further, the plate-like member 64 extended from the lower face of the end cap horizontal portion 62 is formed between the two projections 63 by the projection length the same that of the two projections 63.

The through hole 67 is formed at the center portion in the width direction of the end cap horizontal portion 62. The through hole 67 is the grease nipple attaching hole, the hole 57*a* of the frame member 50 is formed to communicate therewith, and the side seal 7 is also formed with the through hole 71 communicating therewith. The through holes 66*b* for passing the tapping screws 72 as shown in FIG. 1 for fixing the side seal 7 are formed at the both end portions in the width direction of the end cap horizontal portion 62.

The through hole 68 for passing the projection 59 of the frame member 50 is formed at a position between the two through holes 67, 66*b* of the end cap horizontal portion 62. The through hole 68 comprises a small diameter portion 68*a* having a diameter slightly larger than a diameter of a circular column constituting the projection 59 and a larger diameter portion 68*b* having a diameter larger than that of the small diameter portion 68*a*. By putting the projection 59 into the small diameter portion 68*a* of the through hole 68, the frame member 50 is positioned to the end cap 60. Further, a length of the projection 59 is formed by a length by which a front end of the projection 59 comes out from the end cap 60 to slightly outer side under the state.

Further, an inner face in the guiding direction of the end cap horizontal portion 62 is formed with a recessed portion 601 in a shape of a circular column for fitting a front end of the projection 83 of the top cover 8 at the position between the through hole 67 and the through hole 68*a*. Further, an outer face of the end leg 61 of the end cap 60 is formed with the projection 69 for positioning the side seal 7.

Further, the end cap 60 is fabricated by subjecting a synthetic resin of POM or the like to injection molding.

Also according to the slider of the embodiment, similar to the slider of FIG. 2, the longest outer dimension W1 as shown in FIG. 3 in the slider width direction between the lower end portions of the inner legs 41 of the main body 40, the lower end portions are defined end portions on sides of being remote from the main body horizontal portion 42 relative to the recessed portions 43, is formed to be larger than the shortest dimension W2 as shown in FIG. 4 in the slider width direction between the projected portions 54 of the frame member 50.

The slider 2 is integrated by manual operation or pressing process. In the case of the manual operation by a method the same as the above-described method of integrating the main body 4 and the frame member 5, first, the main body 40 and the frame member 50 are integrated by manual operation Thereby, the recessed portions 52*a* of the frame member 50 are made to be continuous to the both ends in the guiding direction of the recessed portion 46A of the main body 40. Further, the main body 40 can be detached from the frame member 50 by manual operation by a method the same as the above-described method of detaching the main body 4 from the frame member 5.

Next, the cover portion 81 of the top cover 8 is put to the recessed portions 46A, 52*a*, and foot portions 82, the projections 83, the recessed portions 84 of the top cover 8 are fitted to respective positions of the recessed portions 58 of the frame member 50. Under the state, the front ends of the projections 83 of the top cover 8 are projected to the both ends in the guiding direction of the frame member 50.

Next, the end caps 60 are arranged at the both ends in the guiding direction of the frame member 50 and the projections 59 of the frame member 50 are put into the through holes 68 of the end cap 60. Thereby, the front ends of the projections 83 of the top cover 8 are put into the recessed portions 601 of the end cap 60 and the projections 63 of the end cap 60 are fitted to the stepped difference portions 51*c* of the frame member 50. Further, the plate-like member 64 of the end cap 60 is fitted to the lower face of the frame member horizontal portion 52 of the frame member 50, and the top cover 8 is locked by being fitted to the frame member 50 and the end cap 60. Further, the hole 57*a* of the frame member horizontal portion 52 of the frame member 50 and the through hole 67 of the end cap 60 are communicated with each other. Under the state, the front ends of the projections 59 of the frame member 50 are slightly projected from the both ends in the slight moving direction of the end cap 60.

Next, by pressing the front end of the projection 59 of the frame member 50 while heating to melt the front end by ultrasonic wave by using an ultrasonic plastic welder, the synthetic resin constituting the front end portion of the projection 59 is plastically made to flow at a clearance between the projection 59 and the large diameter portion 68b of the through hole 68.

Thereby, the end cap 60 is fixed to the frame member 50, and the both ends in the guiding direction of the top cover 8 are fixed to the end cap 60 and the frame member 50. By fixing the top cover 8, the main body 40 is fixed to the frame member 50 in the vertical direction. Further, there is brought about a state in which the projections 59 are not projected from the both end faces in the guiding direction of the end caps 60. As a result, the end cap 60, the frame member 50, the main body 40 and the top cover 8 are integrated to integrate the slider 2.

The linear guide apparatus shown in FIG. 1 is integrated by using the slider 2, the balls 3, the guide rail 1, the side seal 7 and the retaining wire W integrated in this way. At that occasion, first, the balls 3 are put into the return passage 21b, the direction changing passage 22a and the rolling groove 21a of the slider 2, the balls 3 put into the rolling groove 21a are retained by the retaining wire W and thereafter, the slider 2 is integrated to the guide rail 1.

Next, by utilizing the projected portion 69 of the end cap 60, the side seal 7 is positioned to the slider 2, and the side seal 7 is fixed to the slider 2 by a tapping screw 72 by using the through hole 66b of the end cap 60. Next, a grease nipple is inserted into the through hole as one example of grease nipple attaching hole 67 of the end cap 6 via the through hole 67 of the side seal 7.

According to the linear guide apparatus of the embodiment, the slider 2 is divided into the main body 40 having the rolling groove 21a, the frame member 50 having the return passage 21b and the inner groove 53 of the direction changing passage 22a, and the end cap 60 having the outer groove 63a of the direction changing passage 22a and therefore, in comparison with a slider described in JP-A-7-317762, mentioned above, for integrally molding the molded member including the return passage portion which corresponds to the frame member 50 of the embodiment into the block member, the shape of the rolling groove can easily be modified after molding.

Further, since the frame member 50 is molded by the single member, the molding performance is more excellent than in the case of integral molding and the structure of the die can be simplified. Further, the production system pursuing the efficiency of molding can be adopted since production of the frame member 50 is progressed independently from production of the main body 40. Further, the main body 40 and the frame member 50 can simply be attached and detached even by manual operation as described above.

In addition thereto, according to the linear guide apparatus of the embodiment, integration of the slider 2 is carried out by "calking" by ultrasonic heating. The calking is a method of constituting one of two members to be welded by a projection and constituting other thereof by a shape of putting the projection and bonding the two members by making the projection flow plastically. Therefore, it is not necessary to form a female screw at a metal. That is, the slider 2 according to the embodiment is advantageous in view of the productivity in comparison with the slider described in JP-A-7-317762, mentioned above, and the case of fixing the structure shown in FIG. 2 by screwing.

Further, the method of integrating the slider constituting the linear guide apparatus of the present invention without using the screw is not limited to the above-described "calking" by ultrasonic heating but may be a welding method which is not accompanied by "calking".

Further, although according to the above-described respective embodiments, the frame members 5, 50 and the end caps 6, 60 are made by a synthetic resin, the present invention is not limited thereto. For example, it is effective to form the frame members 5, 50 and the end caps 6, 60 by a metal by an MIM method (Metal Injection Molding method) when, for example, an environment used is at high temperature or in vacuum and therefore, the frame members and the end caps cannot be made by a synthetic resin or the like.

When the main bodies 4, 40 and the frame members 5, 50 cannot be attached and detached by elastically deforming the frame members 5, 50 as in the case, it is necessary to make the longest outer dimension W1 as shown in FIG. 3 in the slider width direction between the lower end portions of the inner legs 41 of the main bodies 4, 40 smaller than the shortest dimension W2 as shown in FIG. 4 in the slider width direction of the projected portions 54 of the frame members 5, 50. Further, although according to the above-described respective embodiments, the tapered faces 44 are provided between the main body horizontal portions 42 and the recessed portions 43 of the main bodies 4, 40 and the taper faces 51d fitted to the taper faces 44 are provided at the frame members 5, 50, according to the present invention, the tapered face 44 is not an indispensable condition but a boundary between the main body horizontal portion 42 and the inner leg 41 may be formed in the right angle.

Further, although according to the embodiment, a description has been given of the linear guide apparatus having two pieces of the circulating passages, the linear guide apparatus of the present invention is not characterized in a number of pieces of the circulating passages but a linear guide apparatus having four pieces or more is naturally included in the linear guide apparatus of the present invention.

A second embodiment of the present invention will be explained as follows.

Figure 8:
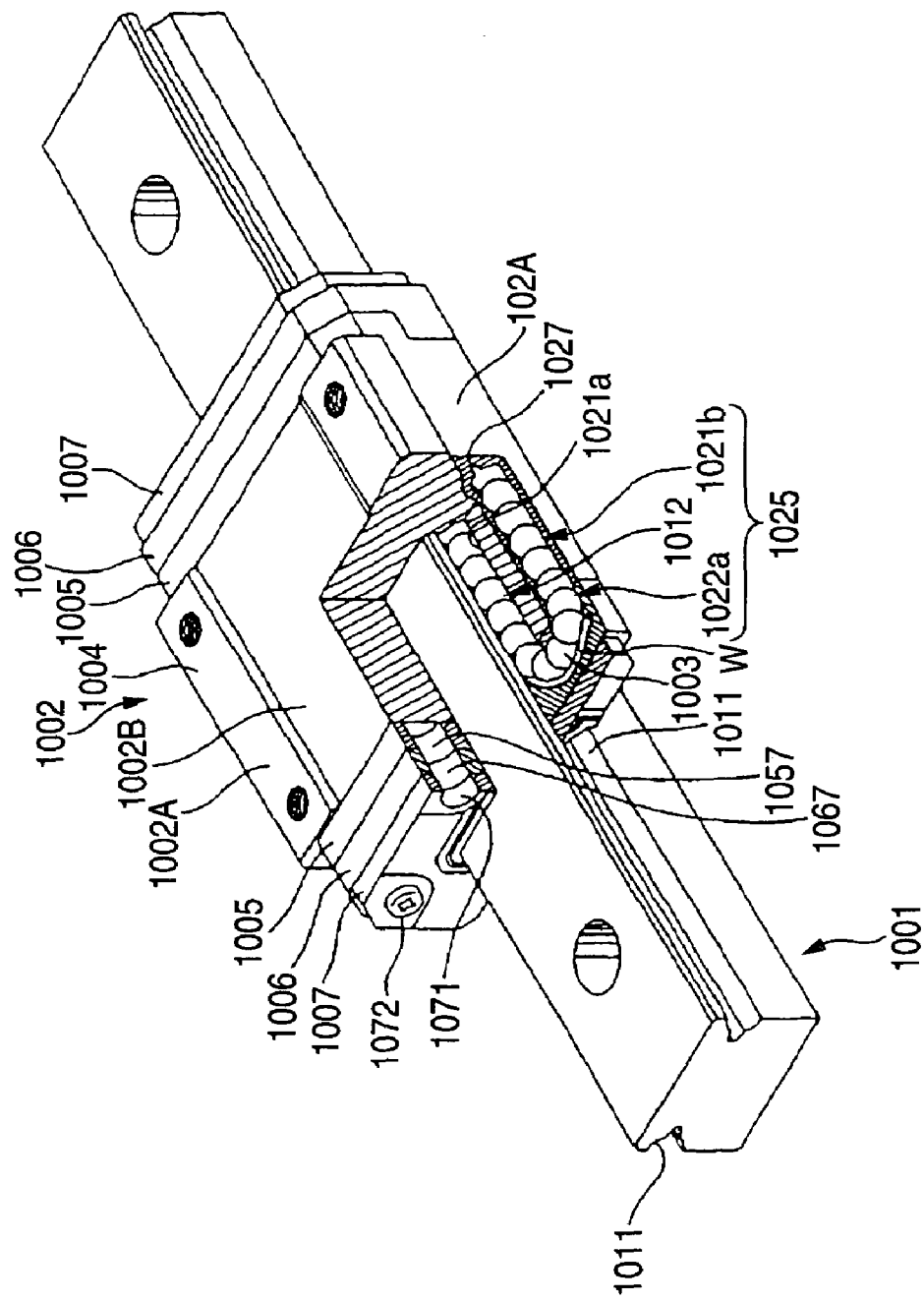
FIG. 8 is a perspective view showing a linear guide apparatus in correspondence with another embodiment of the present invention.

FIG. 8 is a perspective view showing a linear guide apparatus in correspondence with an embodiment of the present invention. The linear guide is constituted by a guide rail 1001, a slider 1002 and a plurality of balls 1003.

The guide rail 1001 includes rolling grooves 1011 extended in parallel with a longitudinal direction at both side faces thereof. The slider 1002 comprises leg portions 102A arranged on both sides in a width direction of the guide rail 1001 and a horizontal portion 102B connecting the two leg portions 102A. The horizontal portion 102B is arranged on one end side in a thickness direction of the guide rail 1001 i.e., upper face side of the guide rail 1001 in FIG. 8. Further, both inner side faces of the slider 1002 are arranged to be opposed to both side faces of the guide rail 1001.

Inner side faces of the two leg portions 102A of the slider 1002 are formed with rolling grooves 1021a opposed to the rolling grooves 1011 of the guide rail 1001. A rolling passage 1012 of the balls 1003 is formed by the rolling grooves 1011, 1021a.

Return passages 1021b of the balls are linearly formed at outer side portions of the two leg portions 1002A, further, a direction changing passage 1022a for communicating the return passage 1021b and rolling passage 1012 is formed. A circulating passage 1025 for infinitely circulating the balls 1003 is constituted by the return passage 1021b, the rolling passage 1012 and the direction changing passage 1022a. The linear guide apparatus is provided with two pieces of the circulating passages and the slider 1002 is slid along the guide rail 1001 by rolling the balls 1003 in the respective circulating passages.

The slider 1002 of the embodiment is constituted by a main body 1004 made of a metal, a frame member 5 made of a synthetic resin and an end cap 1006 made of a synthetic resin. Further, a side seal 1007 is attached on an outer side of the end cap 1006.

Figure 9:
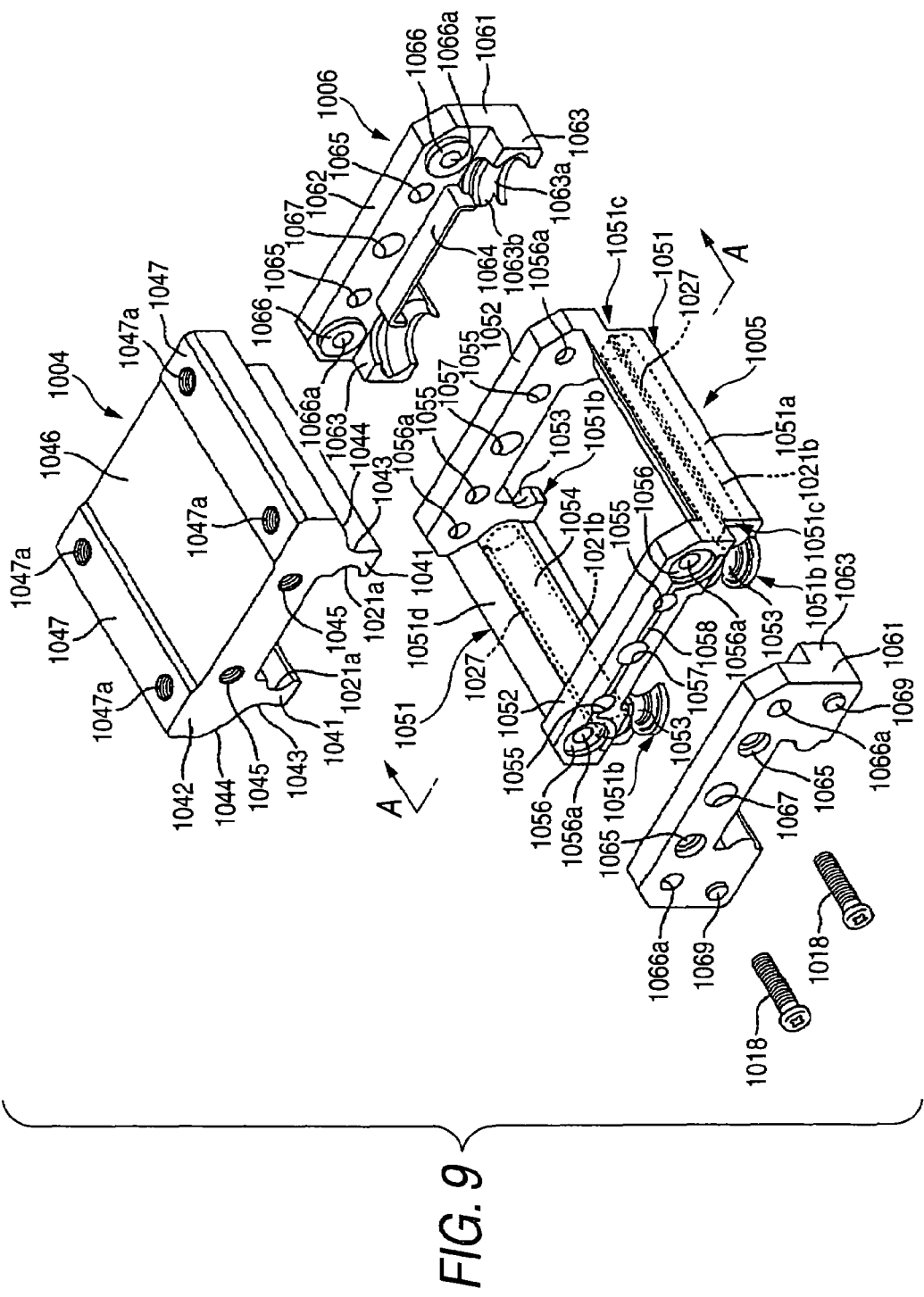
FIG. 9 is a perspective view showing a disassembled state of another embodiment of the slider.
Figure 10:
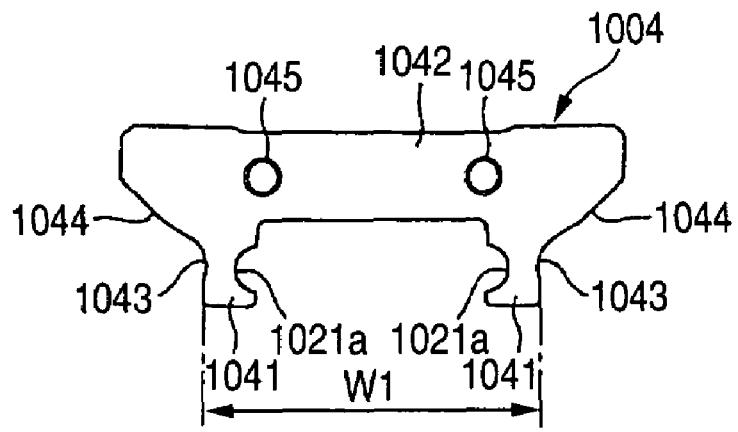
FIG. 10 is a front view showing a main body constituting the slider of FIG. 9.
Figure 11:
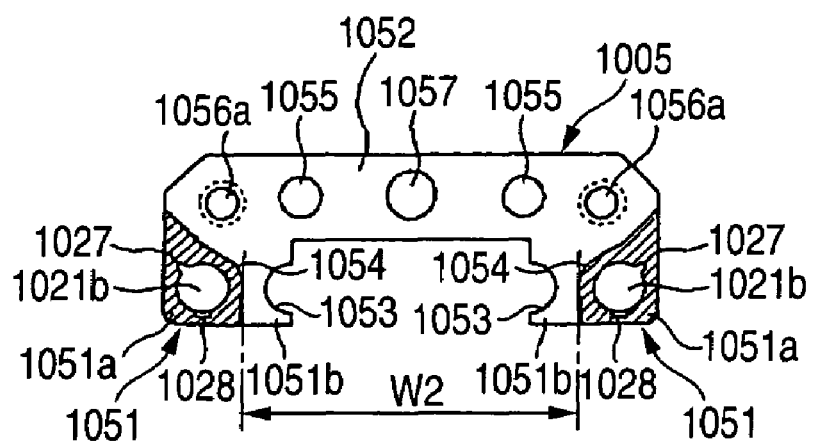
FIG. 11 is a sectional view taken along a line A-A of FIG. 9.
Figure 12:
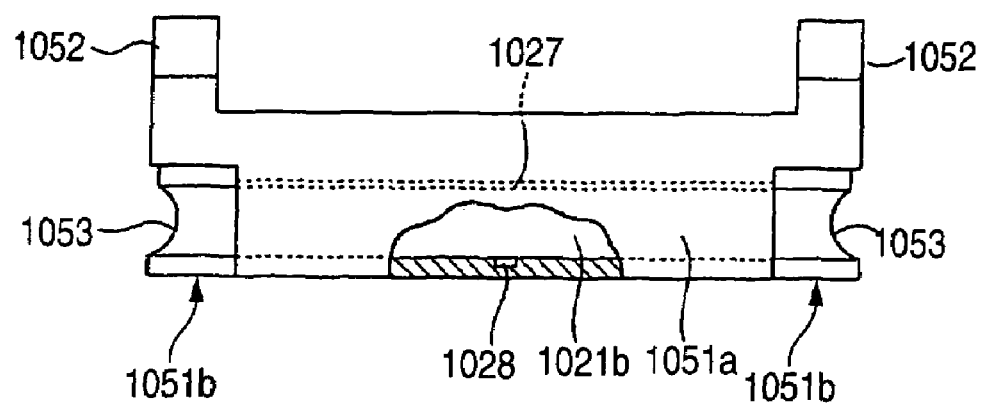
FIG. 12 is a partially sectional side view of the frame member constituting the slider of FIG. 9.
Figure 13:
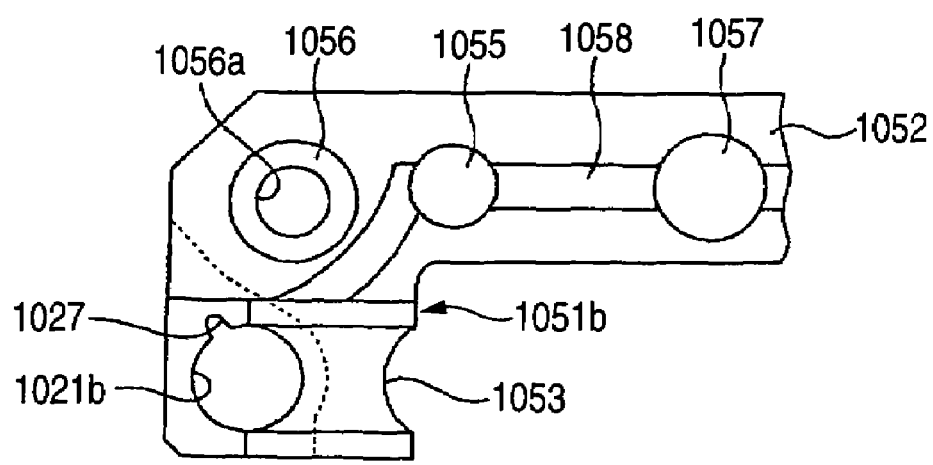
FIG. 13 is a partial front view of the frame member constituting the slider of FIG. 9.

FIG. 9 shows a disassembled state of the slider 1002 by a perspective view. Further, FIG. 10 shows a front view of the main body 1004 and FIG. 11 shows a sectional view taken along a line A-A of FIG. 9 of the frame 1005. Further, FIG. 12 shows a partially sectional side view of the frame member 1005 and FIG. 13 shows a partial front view of the frame member 1005.

As shown by the drawings, the main body 1004 comprises inner legs 1041 constituting inner side portions in the width direction of the two leg portions 1002A, and a main body horizontal portion 1042 constituting an essential portion of the horizontal portion 1002B of a total of the slider. Further, a rolling groove 1021a is formed on an inner side of the inner leg 1041, and a recessed portion 1043 in parallel with the rolling groove 1021a is formed on an outer side of the inner leg 1041. A tapered face 1044 a dimension on a side of the recessed portion 1043 of which is small is formed between a recessed portion 1043 and an end face in the width direction of the main body horizontal portion 1042.

Further, respective two pieces of female screws 1045 are formed at both end faces in a guiding direction of the main body horizontal portion 1042. Two pieces of the female screw 104S are arranged at a predetermined interval in the width direction. A recessed portion 1046 is formed at a center portion in a slider width direction of an upper face of the main body horizontal portion 1042, and outer side portions 1047 at side portions of the recessed portion 1046 are formed with respective two pieces of female screw holes 1047a for attaching other member of a table or the like at a predetermined interval in the guiding direction.

Further, the main body 1004 is made of SUS 440C or the like. The main body 1004 is fabricated by drawing process or cutting process of the metal.

The frame member 1005 comprises outer legs 1051 constituting outer side portions in the width direction of the two leg portions 1002A and a frame member horizontal portion 1052 constituting an end portion in a guiding direction of the horizontal portion 1002B of the total of the slider.

The outer leg 1051 comprises a first portion 1051a and a second portion 1051b. The first portion 1051a is arranged to connect the two frame member horizontal portion 1052 and is formed with the return passage 1021b at inside thereof. The return passage 1021b is formed with an oil groove 1027 along the longitudinal direction. According to the example, the oil groove 1027 in a shape of a small hook is formed to extend from the return passage 1021b in a skewed upper direction at a position on an outer side in the width direction of the slider and on the side of the frame horizontal portion 1052. Further, as shown by FIG. 12, a groove 1028 constituting an oil storage is formed at a lower portion of a center position in the longitudinal direction of the oil groove 1027.

The second portions 1051b of the outer legs 1051 are projections in a shape of a semicircular arc extended in directions of outer faces of the two frame member horizontal portions 1052 and the projection is formed with an inner groove 1053 of the direction changing passage 1022a continuous to the return passage 1021b. Further, end faces in the guiding direction of the first portions 1051a of the outer legs 1051 and lower faces of two end portions in the width direction of the frame member horizontal portion 1054 are orthogonal to each other and the portions constitute stepped portions 1051c.

Further, an upper face of the first portion 1051a of the outer leg 1051 is formed in a tapered face 1051d fitted to the tapered face 1044 of the main body 1004. Further, a projected portion 1054 in parallel with the return passage 1021b is formed on an inner side of the first portion 1051a of the outer leg 1051.

The frame member horizontal portion 1052 is formed with a through hole 1055 in correspondence with the female screw 1045 of the main body 1004. The frame horizontal portion 1052 is further formed with recessed portions 1056 for positioning the end cap 1006, and through holes 1056a penetrating centers of the recessed portions 1056 at both end portions in the width direction. A through hole 1057 is formed at a center portion in the width direction of the frame member horizontal portion 1052. The through hole 1057 is a hole communicating with a through hole i.e., grease nipple attaching hole 1067, provided at the end cap 1006.

The frame member horizontal portion 1052 is further formed with an oil passage 1058. The oil passage 1058 is extended straightly from the through hole 1057 communicating with the grease nipple attaching hole i.e., oil feeding hole 1067 of the end cap 1006 to the through holes 1055 on the both sides and thereafter folded to bend to a lower side before the recessed portions 56 for positioning to reach a lower end of the frame member horizontal portion 1052.

Further, the frame member 1005 is fabricated by subjecting a synthetic resin of POM or the like to injection molding. Here, the groove 1028 constituting the oil storage is formed by further working the groove 1028 after injection molding.

The end caps 1006 are members arranged at both end portions in the guiding direction of the frame member 1005 and comprises end legs 1061 constituting end portions in the guiding direction of the two leg portions 1002A, and an end cap horizontal portion 1062 constituting an endmost portion in the guiding direction of the horizontal portion 1002B of the total of the slider. A side of the frame member of the end leg 1061 is formed with a projection 1063 having a recess in a shape of a semicircular arc and the projection 1063 is formed with an outer groove 1063a of the direction changing passage 1022a. An end portion on an inner side in the width direction of the outer groove 1063a constitutes a tongue 1063b for scooping up the balls 1003 from the rolling groove 1012. Further, a plate-like member 1064 extended from the lower face of the end cap horizontal portion 1062 is formed between the two projections 1063 by a projection length the same as that of the two projections 1063.

Further, the end cap horizontal portion 1062 is formed with a through hole 1065 in correspondence with the female screw 1045 of the main body 1004. Inner faces of both end portions in the width direction of the end cap horizontal portion 1062 are formed with projections 1066 for positioning the frame member 1005 and through holes 1066a penetrating centers of the projections 1066. By fitting the projection 1066 to the recessed portion 1056 of the frame member 1005, the through hole 1056a of the frame member 1005 and the through hole 1066a of the end cap 1006 are communicated with each other.

The through hole 1067 is formed at the center portion in the width direction of the end cap horizontal portion 1062. The through hole 1067 is the grease nipple attaching hole, the through hole 1057 of the frame member 1005 is formed to communicate therewith, and also the side seal 1007 is formed with a through hole 1071 to communicate therewith. Further, an outer face of the end leg 1061 is formed with a projection 1069 for positioning the side seal 1007.

Further, the end cap 1006 is fabricated by subjecting a synthetic resin of POM or the like to injection molding.

Here, a longest outer dimension W1 as shown in FIG. 10, in a slider width direction between low end portions of the inner legs 1041 of the main body 1004 is formed to be larger than a shortest dimension W2 as shown in FIG. 11 in the slider width direction between the projected portions 1054 of the frame member 1005. The end portions of the inner leg 1041 of the main body 1004 are provided on an end which is opposite side of the recessed portion 1043.

Integration of the slider 1002 is carried out by manual operation or pressing process. In the case of manual operation, first, the inner legs 1041 to the main body 1004 are put into the frame member 1005 from a side of the frame member horizontal portion 1052, the thumb is touched to either one of the outer side portion 47 of the upper face of the main body horizontal portion 1042 and the lower portion 1051a of the outer leg 1051 of the frame member 1005, the forefinger and the middle finger are touched to other thereof, and a force in a direction of making the thumb and the forefinger as well as the middle finger proximate to each other is exerted by the both hands simultaneously on both left and right sides.

Figure 14:
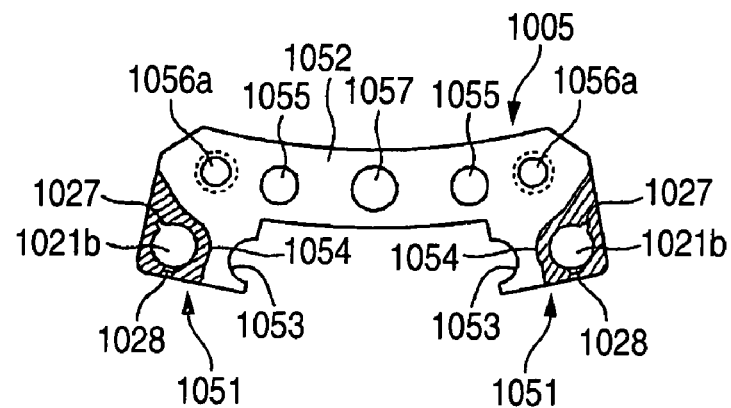
FIG. 14 is a sectional view showing a state of elastically deforming the frame member constituting the slider of FIG. 9.

Thereby, the frame member 1005 is elastically deformed as shown by FIG. 14, and the projected portion 1054 of the frame member 1005 is fitted to the recessed portion 1042 of the main body 1004. Further, the inner leg 1041 of the main body 1004 and the first member 1051a with the outer leg 1051 of the frame member 1005 are fitted to each other, the tapered face 1044 of the main body 1004 and the tapered face 1051d of the frame member 1005 are fitted to each other, and the outer face of the main body horizontal portion 1042 of the main body 1004 and the inner face of the frame member horizontal portion 1052 of the frame member 1005 are fitted with each other. In this way, the main body 1004 and the frame member 1005 are easily integrated, and positioning in the width direction and the guiding direction and the vertical direction i.e., thickness direction in FIG. 14 is carried out finely.

Further, when the main body 1004 is detached from the frame member 1005, one end in the integrated object is held by the one hand and other end thereof is held by the other hand. Further, in each of the hands, for example, the thumb is touched to the lower face of the main body horizontal portion 1042 of the main body 1004, the forefinger and the middle finger are touched to the upper face of the frame member horizontal portion 1052 of the frame member 1005, and a force of pressing the main body horizontal portion 1042 by the thumb and a force of pressing the upper face of the frame member horizontal portion 1052 by the forefinger and the middle finger are exerted simultaneously. Thereby, the frame member 1005 is elastically deformed as shown by FIG. 14 and fitting of the respective portions of the main body 1004 and the frame member 1005 is released.

After integrating the main body 1004 and the frame member 1005 as described above, by arranging the end caps 1006 to both ends in the guiding direction of the frame member 1004 and fitting the projections 1066 of the end caps 1006 to the recessed portions 1056 of the frame member 1005, the projections 1063 of the end caps 1006 are fitted to the stepped portions 1051c of the frame member 1005. Further, the plate-like member 1064 of the end caps 1006 is fitted to the lower face of the frame member horizontal portion 1052 of the frame member 1005 and the through hole 1053 of the frame horizontal portion 1052 of the frame member 1005 and the through hole 1065 of the end cap 1006 are communicated. Further, the through hole 1056a of the frame member 1005 and the through hole 1066a of the end cap 1006 are communicated with each other.

Further, by passing a screw 1018 to the through holes 1055, 1065 from an outer side of the end cap 1006 and screwing a front end thereof to the female screw 1045 of the main body 1004, the end cap 1006 and the frame member 1005 are fixed to the main body 1004 by the screw 1018 to thereby integrate the slider 1002.

By using the slider 1002, the balls 1003, the guide rail 1001, the side seal 1007 and a retaining wire W integrated in this way, the linear guide apparatus shown in FIG. 8 is integrated. At this occasion, first, the balls 1003 are put into the return passage 1021b, the direction changing passage 1022a and the rolling groove 1021a of the slider 1002, the balls 1003 put into the rolling groove 1021a are retained by the retaining wire W and thereafter, the slider 1002 is integrated to the guide rail 1001.

Next, by utilizing the projected portion 1069 of the end cap 1006, the side seal 1007 is positioned to the slider 1002, and the side seal 1007 is fixed to the slider 1002 by a tapping screw 1072 by using the through holes 1056a, 1066a. Next, a grease nipple is inserted into the through hole i.e., grease nipple attaching hole 1067 of the end cap 1006 via the through hole 1071 of the side seal 1007.

The linear guide is used after supplying a lubricant from the grease nipple to the grease nipple attaching hole 1067 of the end cap 1006. The supplied lubricant is brought into the through hole 1057 of the frame member horizontal portion 1052 from the grease nipple attaching hole 1067 and brought into the return passage 1021b by passing the oil passage 1058. The lubricant brought into the return passage 1021b is filled in the oil groove 1027 and is stored at the oil storage 1028.

Therefore, when the lubricant at inside of the return passage 1021b is reduced, the lubricant is supplied from the oil groove 1017 and the oil storage 1028 into the return passage 1021b. Therefore, the lubricant is supplied from the return passage 1021b to the rolling passage 1012 and the direction changing passage 1022a over a long period of time and therefore, an excellent lubricating state is maintained at inside of the circulating passage 1025 over a long period of time.

Further, according to the linear guide of the embodiment, in the width direction of the slider 1002, the frame member 1005 is attached to the main body 1004 by tight fitting, further, the frame member 1005 and the end cap 1006 are fixed to the main body 1004 by screwing in the guiding direction of the slider 1002. Therefore, in comparison with the linear guides described in Patent References 2 and 3, vibration in driving is reduced.

Further, although according to the above-described embodiment, the slider 1002 is integrated by fixing the frame member 1005 and the end cap 1006 to the main body 1004 by screwing, the slider constituting the linear guide of the present invention can be integrated by a method of welding or the like without using a screw.

Further, although according to the above-described embodiment, the frame member 1005 is attached to the main body 1004 by tight fitting in the width direction of the slider 1002, the frame member 1005 may be attached to the main body 1004 by tight fitting in the guiding direction of the slider 1002, or the frame member 1005 may be attached to the main body 1004 by tight fitting both in the width direction and the guiding direction.

Figure 15:
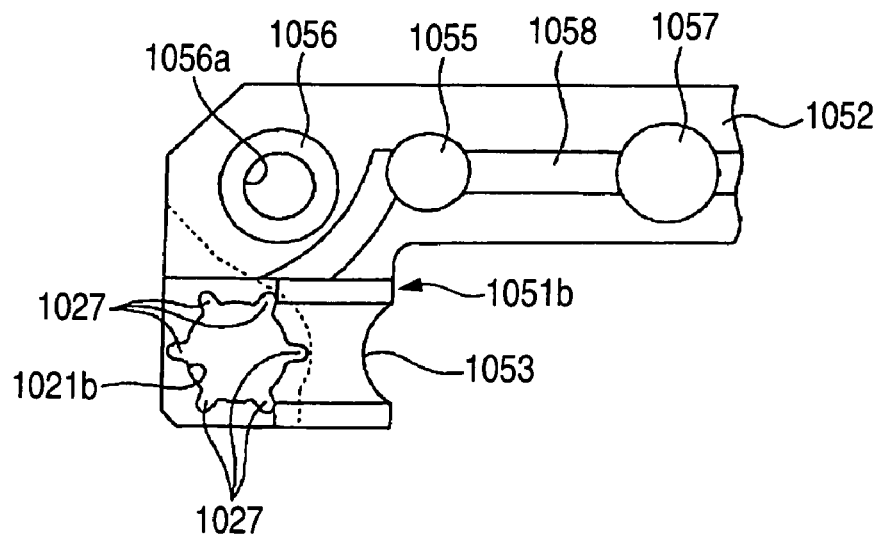
FIG. 15 is a partial front view of a frame member for explaining an example of a number, a position of forming and a sectional shape of oil grooves different from those of FIG. 13.
Figure 16:
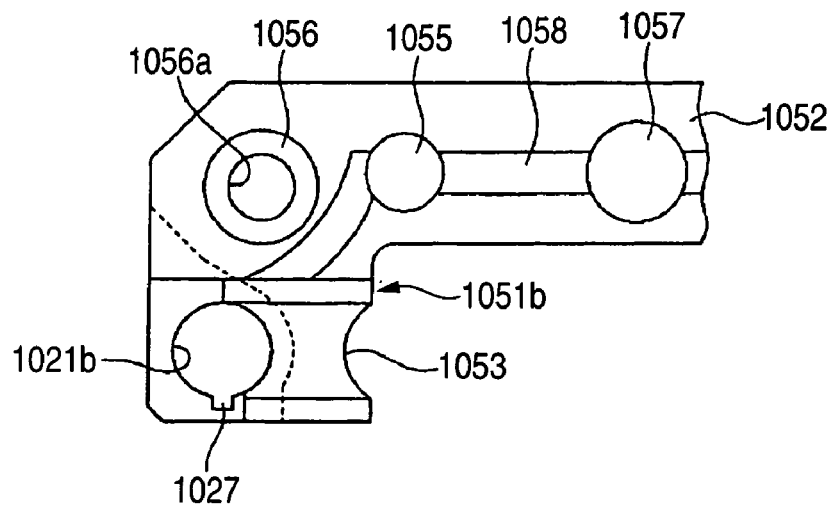
FIG. 16 is a partial front view of a frame member for explaining a number, a position of forming and a sectional shape of oil grooves different from those of FIG. 13.
Figure 17:
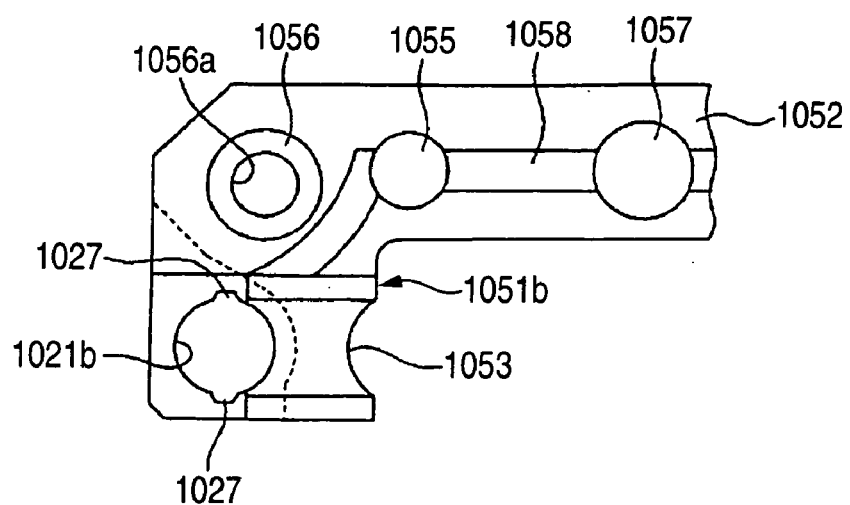
FIG. 17 is a partial front view of a frame member for explaining a number, a position of forming and a sectional shape of oil grooves different from those of FIG. 13.

Further, a number, a position of forming and a sectional shape of the oil groove 1027 are pertinently selected by an attitude of attaching the linear guide when used or the like. Examples thereof are shown in FIGS. 15 through 17. In the example of FIG. 15, six pieces of the oil grooves 1027 each in a hook-like shape having a small section are arranged at equal intervals along a section circle of the return passage 1021b. In the example of FIG. 16, only a single oil groove 1027 having a rectangular section is arranged on a lower side of the return passage 1021b. The side is opposed to the frame member horizontal portion 1052.

In the example of FIG. 17, ones of the oil grooves 1027 are arranged on an upper side and a lower side of the return passage 1021b. A section of the oil groove 1027 is constituted by a shape comprising a circular arc concentric with the section circle of the return passage 1021b and having a large diameter, and tapered lines a dimension of which is widened from both ends of the circular arcs to the return passage 1021b.

Further, by forming at least the first member 1051a of the outer leg 1051 of the frame member 1005 by a resin including a lubricant, the excellent lubricating state can be maintained over a longer period of time.

As a resin component of the resin including a lubricant, polyolefin resin of polypropylene, poly 4-methylpenten-1 resin or the like, or a thermosetting resin of phenolic resin, urethane resin or the like is pointed out. As a lubricant component thereof, mineral oil, poly α-olefin oil, alkylpolyphenylether oil, ester oil, diester oil, alkylnaphthalnene oil or the like is pointed out.

Figure 18:
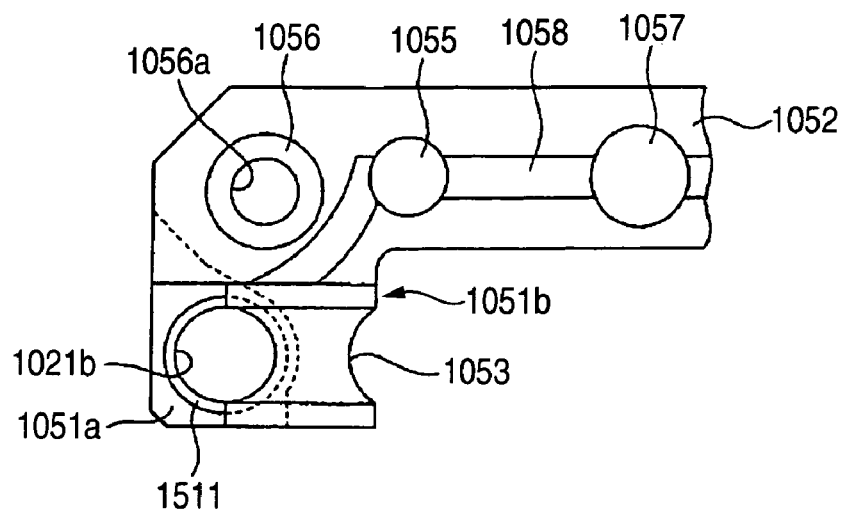
FIG. 18 is a partial front view of a frame member for explaining an example different from FIG. 13.
Figure 19:
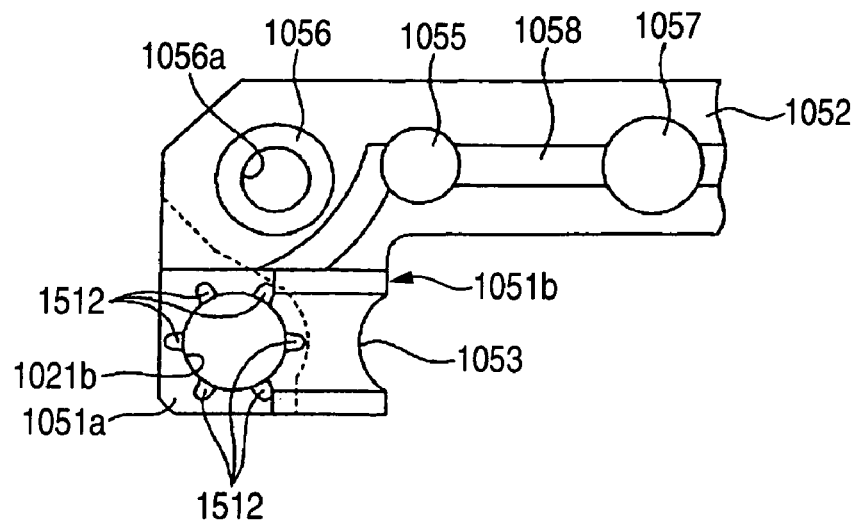
FIG. 19 is a partial front view of a frame member for explaining an example different from FIG. 13.

In the example of FIG. 18, the first member 1051a is provided with a cylindrical member 1511 comprising a resin including a lubricant and an inner-peripheral face thereof is made to constitute the return passage 1021b. In the example of FIG. 19, a rod member 1512 comprising a resin including a lubricant is provided at a portion of the oil groove 1028 of FIG. 15. Further, a total of the frame members 1005 can also be formed by a resin including a lubricant.

Further, in the above-described embodiment, the tapered face 1044 is formed between the main body horizontal portion 1042 and the recessed portion 1043 of the main body 1004, and the tapered face 1051d is formed on the frame member 1005 so as to fit with the tapered face 1044. However, the tapered face 1044 is not an indispensable condition in the present invention. It may acceptable that a boundary between the main body horizontal portion 1042 and the inner leg 1041 is formed by right angle.

Further, although according to the embodiment, a description has been given of the linear guide having two pieces of the circulating passages, the linear guide of the present invention is not characterized in a number of pieces of the circulating passages but also a linear guide having four pieces thereof or more is naturally included in the linear guide of the present invention.

As has been explained above, according to the invention, there is provided the linear guide apparatus which is the linear guide apparatus having the slider in which the return passage of the rolling element is constituted by the undivided member and in which the productivity of the slider is higher than that of the slider described in JP-A-7-317762.

Further, according to the slider constituting the linear guide apparatus of the present invention, the leg portion comprises the divided member in the width direction, the return passage of the rolling element is constituted by the undivided member and therefore, by making the frame member having the return passage by a synthetic resin, in comparison with the case of boring the return passage at the slider made of a metal, fabrication cost can be reduced and dust formation can be restrained since wear by moving the rolling element in the return passage is made to be difficult to be brought about.

Further, according to the slider constituting the linear guide apparatus of the present invention, the frame member integrally molded with the return passage and the inner groove of the direction changing passage is provided and therefore, in comparison with the slider in which the return passage and the inner side groove of the direction changing passage are separately formed and integrated by assembling, the rolling element is smoothly moved and a number of parts can be reduced.

Further, according to the slider constituting the linear guide apparatus of the present invention, the return passage of the rolling element is constituted by the undivided member and therefore, in comparison with the case in which the return passage is constituted by the recessed groove provided on the outer side of the leg portion of the slider and the inner face of the closing member, fabrication cost can be reduced and emittance of noise can be restrained. Further, although when the return passage of the rolling element is constituted by the divided members, it is necessary to deal with invasion of a foreign matter or leakage of a lubricant from a bonding position of the divided members, it is not necessary to deal therewith by constituting the return passage by the undivided member.

In the linear guide apparatus of the present invention, it is preferable that the frame member is made of a synthetic resin, a longest outer dimension in a slider width direction between end portions on the lower side of the recessed portion of the two inner legs of the main body is formed to be larger than a shortest dimension in the slider width direction between the projected portions of the frame body and the attachment and the detachment is carried out by putting the leg portion side of main body to and from the frame member horizontal portion side.

In the linear guide apparatus of the present invention, it is preferable that female screws are formed at two end faces in a guiding direction of the main body horizontal portion, through holes in correspondence with the female screws are formed at the frame member horizontal portion and the end cap horizontal portion, and the end cap and the frame member are fixed to the main body by male screws corresponded to the female screws via the through holes of the end cap and the frame member. In the linear guide apparatus of the present invention, it is preferable that a recessed portion is provided at the center portion in the slider width direction of an upper face of the main body horizontal portion, a plate-like member arranged at inside of the recessed portion is provided, portions of the end cap horizontal portion to be engaged with the frame member side are provided at two end portions in the guiding direction of the plate-like member, fitting portions for fitting with the respective engaging portions are formed on the frame body side of the end cap horizontal portion, the plate-like member is locked by being fitted to the end cap, a projection extended in the guiding direction is formed on an outer side of the frame member horizontal portion, a through hole for passing the projection is formed at the end cap horizontal portion, and the end cap is fixed to the frame member by passing the projection to the through hole and melting a front end of the projection by ultrasonic heating.

According to the linear guide of the present invention, in the linear guide in which the outer side portion in the width direction of the leg portion of the slider is formed by the mold member comprising a synthetic resin separately from a block member made of a metal, in comparison with the linear guides described in the JP-B-2936166 and JP-B-3182134, vibration in driving can be restrained to be low and an acoustic characteristic thereof can be improved.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A linear guide apparatus, comprising:
a guide rail having an inner groove of a rolling passage on each side thereof;
a slider slidably mounted on said guide rail, said slider having outer grooves of the rolling passage respectively disposed in opposition to said inner grooves of said guide rail so as to define the rolling passages therebetween, said slider being provided with a number of circulating passages; and
a number of rolling elements being put in each of said circulating passages,
wherein each of said circulating passages includes said rolling passage, a return passage extending in parallel with said rolling passages, and direction changing passages interconnect said rolling passage and said return passage,
said slider includes a metal main body, a frame member attachably and detachably engaging with an outer side of the metal main body, wherein the frame member is attachable with the outer side of the metal main body after being detached therefrom, and end caps provided on both axial direction ends of the frame member,
the metal main body includes a body horizontal portion and inner leg portions provided on both width direction ends of the body horizontal portion,
each inner leg portion of the metal main body has recessed portions at an outer side thereof along with the axial direction of the slider respectively, and the outer grooves of the rolling passage at both inner sides thereof respectively,
the frame member includes, frame horizontal portions provided on both ends in the axial direction of the slider, and outer leg portions provided on both width direction ends of the frame horizontal portion,
each of the outer leg portions has the return passage, inner grooves of the direction changing passage, and projection portions at inner sides thereof along with the axial direction of the slider, the projection portions being opposed to the recessed portions of the metal main body,
the end cap includes an end cap horizontal portion and end leg portions provided on both width direction ends of the end cap horizontal portion,
the projection portions of the frame member engage with the recessed portions of the metal main body respectively so as to integrally couple with the metal main body and the frame member, and the end caps are fixed to the metal main body via the frame member.

2. The linear guide apparatus as set forth in claim 1, wherein the return passage has a portion for enhancing a lubricating state of the rolling elements.

3. The linear guide apparatus as set forth in claim 2, wherein said portion of the return passage is an oil groove extending in the axial direction.

4. A linear guide apparatus as set forth in claim 2, wherein the portion of the return passage is an oil groove extending along with an axial direction of the slider, and
the frame horizontal portion has an oil supplying hole and an oil passage on an end cap side thereof, the oil passage communicating with the oil supplying hole.

5. The linear guide apparatus as set forth in claim 1, wherein each of the projection portions extends from one end to the other end of the frame member in the axial direction thereof.

6. The linear guide apparatus as set forth in claim 1, wherein the frame member is made of synthetic resin,
the metal main body has an outer largest dimension in a width direction of the slider defined at a portion between lower end portions of the inner leg portions and
the frame member has an inner smallest dimension in a width direction of the slider defined at a portion between the projected portions of the frame member, which is smaller than the outer largest dimension,
the metal main body is engaged with the frame member in such a manner that the leg portion is inserted to the frame member from a frame horizontal portion side after elastically deforming the frame member.

7. The linear guide apparatus as set forth in claim 6, wherein female screws are formed at both end faces of the body horizontal portion in the axial direction,
through holes in correspondence with the female screws are formed at the frame member horizontal portion and the end cap horizontal portion, and
male screws are connected the female screws by passing the through holes of the end cap and the frame member to thereby fix the end cap and the frame member to the metal main body.

8. The linear guide apparatus as set forth in claim 1, wherein female screws are formed at both end faces of the metal main body horizontal portion in the axial direction,
through holes in correspondence with the female screws are formed at the frame member horizontal portion and the end cap horizontal portion, and
male screws are connected with the female screws by passing the through holes of the end cap and the frame member to thereby fix the end cap and the frame member to the metal main body.

9. A linear guide apparatus as set forth in claim 1, wherein the inner leg of the metal main body, the outer leg portion of the frame member and the end leg portion of the end cap form a leg portion of the slider,
a horizontal portion of the slider is formed of the body horizontal portion which forms main part thereof, the frame horizontal portion and the end cap horizontal portion which forms an end portion in the axial direction of the guide rail, the horizontal portion of the slider is provided at a thickness direction side of the slider and connects with the leg portions of the slider.

10. The linear guide apparatus as set forth in claim 1, wherein the outer leg portion of the frame member comprises a flat portion on an inner side surface thereof and the projection portion protrudes inwardly from a plane of the flat portion, and the return passage is provided in a position outwardly from the plane of the flat portion.

* * * * *